US011971590B2

(12) United States Patent
Hashizume et al.

(10) Patent No.: US 11,971,590 B2
(45) Date of Patent: Apr. 30, 2024

(54) OPTICAL COUPLING METHOD

(71) Applicant: Nippon Telegraph and Telephone Corporation, Tokyo (JP)

(72) Inventors: Yasuaki Hashizume, Musashino (JP); Yoshihiro Ogiso, Musashino (JP); Josuke Ozaki, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 205 days.

(21) Appl. No.: 17/768,695

(22) PCT Filed: Oct. 29, 2019

(86) PCT No.: PCT/JP2019/042421
§ 371 (c)(1),
(2) Date: Apr. 13, 2022

(87) PCT Pub. No.: WO2021/084627
PCT Pub. Date: May 6, 2021

(65) Prior Publication Data
US 2023/0350133 A1    Nov. 2, 2023

(51) Int. Cl.
*G02B 6/42* (2006.01)
*G02F 1/225* (2006.01)
*G02B 6/293* (2006.01)
*G02B 6/32* (2006.01)

(52) U.S. Cl.
CPC ............ *G02B 6/422* (2013.01); *G02B 6/4227* (2013.01); *G02F 1/225* (2013.01); *G02B 6/29353* (2013.01); *G02B 6/29355* (2013.01); *G02B 6/32* (2013.01)

(58) Field of Classification Search
CPC .... G02B 6/422; G02B 6/4225; G02B 6/4227; G02F 1/225; G02F 1/2255; G02F 1/2257
See application file for complete search history.

(56) References Cited

U.S. PATENT DOCUMENTS

2010/0104241 A1* 4/2010 Oikawa ................ G02B 6/4225
385/24

FOREIGN PATENT DOCUMENTS

JP     6-94936 A  *  4/1994

OTHER PUBLICATIONS

J. Ozaki et al., *Ultra-low Power Dissipation (<2.4W) Coherent InP Modulator Module with CMOS Driver Ic*, in proc., ECOC' 2018, Rome, Italy, pp. 1-3.

* cited by examiner

*Primary Examiner* — Michael Stahl
(74) *Attorney, Agent, or Firm* — Workman Nydegger

(57) ABSTRACT

In the adjustment method of optical coupling for an optical integrated circuit according to the present disclosure, the optimal adjustment position of optical coupling is determined on the basis of, for example, a sum of a plurality of photocurrents at electrodes on arm waveguides respectively formed on the plurality of MZIs in the polarization-multiplexing IQ modulator. According to the maximum value of the sum of the plurality of photocurrents, the light condensing spot position is adjusted to the center position of the end face core of the optical waveguide of the integrated chip. Typically, the light condensing spot position is adjusted to the center of the end face core by displacing the two input lenses.

8 Claims, 9 Drawing Sheets

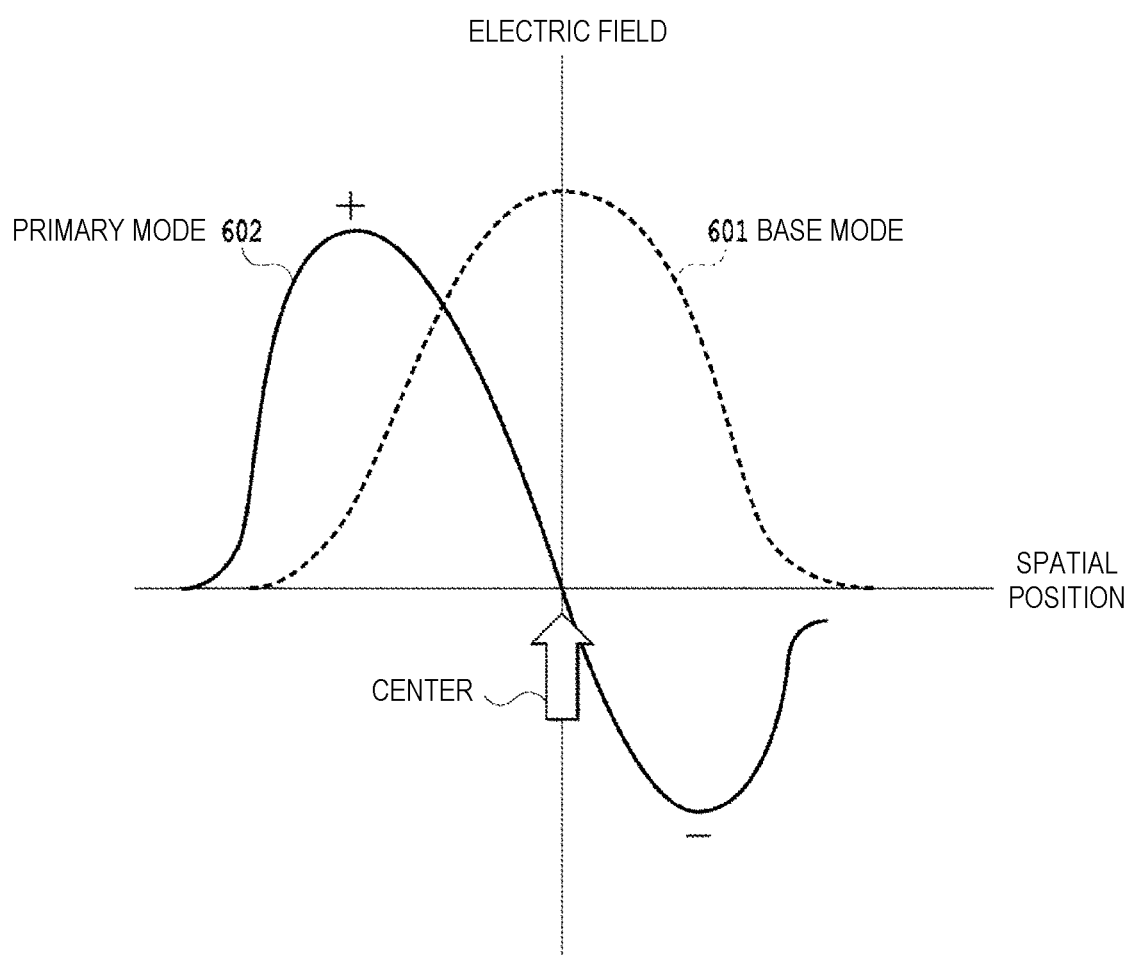

OPTICAL COUPLING METHOD

TECHNICAL FIELD

The present disclosure relates to an optical coupling method for an optical integrated circuit.

BACKGROUND ART

A polarization-multiplexing IQ modulator employing an optical waveguide constituted of an InP-type compound semiconductor is being actively researched and developed as an optical modulator for large-capacity optical communication (Non-Patent Literature 1). The polarization-multiplexing IQ modulator is a key device for large-capacity optical communication, using two different polarized waves and provided with an IQ modulation circuit for X-polarized wave and an IQ modulation circuit for Y-polarized wave.

FIG. 1 is a diagram showing an optical circuit portion integrated on a semiconductor substrate, of a polarization-multiplexing IQ modulator. An integrated chip 100 is provided with: an input waveguide 103; a 1×2 multimode interferometer (MMI) 104; an IQ modulation circuit 102 for X-polarized wave; and an IQ modulation circuit 101 for Y-polarized wave. Light being input to the input waveguide 103 and branched by the 1×2 MMI 104 is input to the two IQ modulation circuits 101, 102. In each of the IQ modulation circuits, Mach-Zehnder interferometers (MZI) are in a nested structure. For example, the IQ modulation circuit 101 for Y-polarized wave includes two arm waveguides between the two MMIs 105-1, 106-1 constituting a parent MZI, and is provided with child MZIs 107, 108 respectively on the arm waveguides. Similarly, the IQ modulation circuit 102 for X-polarized wave is provided with child MZIs 109, 110 respectively on arm waveguides between the two MMIs 105-2, 106-2.

Therefore, there are eight arm waveguides in total in an innermost level of the four child MZIs 107 to 110 constituting the two IQ modulation circuits 101, 102. Each of the arm waveguides is provided with an electrode for changing the phase of light propagating inside the waveguide. At the same time, photocurrents detected by the electrodes can be observed, the photocurrents enabling monitoring of optical power propagating along each of the waveguides. Specifically, two arm waveguides of the MZI 107 on the Q-channel side of the IQ modulation circuit 101 are provided with modulation electrodes 113-1, 113-2 and phase adjustment electrodes 114-1, 114-2. In addition, on an output side of each of the child MZIs, a π/2 phase adjustment electrode 115 for adjusting a phase difference (90°) between the I-channel and the Q-channel is provided.

FIG. 2 is a diagram showing an overall configuration of the polarization-multiplexing IQ modulator and an adjustment system of the optical coupling position thereof. In a polarization-multiplexing IQ modulator 200, an integrated chip 100 of an optical modulation circuit including two systems of IQ modulation circuits shown in FIG. 1 is mounted on a base 202 fixed inside a housing 201. Between the optical modulator 200 and the outside, local light is input from a light source to an input optical fiber 203, and modulated light is output from an output optical fiber 215. On an output side of the integrated chip 100, optical components are provided such as: lenses 206, 207, 213; a polarizing beam splitter 210 controlling a spatial beam; beam splitters 208, 209, 211; a reflector 212; and photo diodes (PDs) 216 to 218 for monitoring optical power. Although not illustrated in FIG. 2, an electrical signal is supplied from the outside and connected to the integrated chip 100 through wire bonding or the like.

The input fiber 203 and the lenses 204, 205 are used for inputting light to the polarization-multiplexing IQ modulator 200. Furthermore, an adjustment system for adjusting an input position of light to the input waveguide 103 is also shown in FIG. 2. In FIG. 2, the input fiber 203, the input lens 204, the input lens 205, and the integrated chip 100 are fixed on the common base 202. The input fiber 203 is fixed on the base 202 with an adhesive, aiming at a mark formed on the base 202. The integrated chip 100 is also fixed on the base 202, aiming at the mark in a similar manner. Subsequently, positions of the two input lenses 204, 205, which are to be inserted and fixed between the input fiber 201 and the integrated chip 100, are adjusted. During the adjustment of the positions, optical power (photocurrent) of the electrode provided on one arm waveguide of the MZI in the integrated chip 100 is monitored. While the photocurrent is monitored, the two input lenses are fixed on the base 202 with lens positions where the optical power is maximized as optimal positions. Adjustment of the position of an optical fiber and adjustment of a position of a single lens instead of the two lenses may also be carried out, as long as light from the input fiber is adjusted to be incident on an optimal position of the input waveguide 103, that is the center of a core cross section. Typically, the positions of the two lenses are respectively or integrally adjusted as shown in FIG. 2.

More specifically, a lead-out wiring and a pad 220 are formed on, for example, the phase adjustment electrode 114 on one arm waveguide of the integrated chip 100. A predetermined voltage is applied from a power source 223 to the pad 220 by means of a contact pin 219. A current 222, which is drawn from the phase adjustment electrode 114 when light irradiated from the input fiber 203 has reached the arm waveguide, may be monitored by an ammeter 221 or the like. The positions of the two lenses 204, 205 have been adjusted such that an absolute value of the monitor current 222 is maximized.

CITATION LIST

Non-Patent Literature

Non-Patent Literature 1: J. Ozaki et al., "Ultra-low Power Dissipation (<2.4 W) Coherent InP Modulator Module with CMOS Driver Ic", in proc., ECOC'2018, Rome, Italy

SUMMARY OF THE INVENTION

Technical Problem

However, the optical coupling adjustment in the optical integrated circuit of the Prior Art had a problem of not being able to accurately guide the lenses and the like to the optimal positions.

Means for Solving the Problem

According to an aspect of the present disclosure, an optical coupling method for an optical integrated circuit including at least an input waveguide, a 1×2 branching circuit optically connected to the input waveguide, and two waveguides optically connected to the 1×2 branching circuit, includes: measuring a sum of optical power of light propagating along each of the two waveguides; changing an optical focusing spot position to the input waveguide, such that the sum of the optical power is maximized; and determining a position of an optical component injecting light to the input waveguide with respect to the optical integrated circuit.

It is preferable that the optical power of the light propagating along the waveguides is determined on the basis of photocurrent detected by electrodes respectively provided on the two waveguides, and the step of measuring may include measuring a sum of photocurrents of the two respective waveguides.

Effects of the Invention

The optical coupling method for an optical integrated circuit according to the present disclosure enables more accurate adjustment of the optical focusing spot position to a core center position of the optical waveguide.

BRIEF DESCRIPTION OF DRAWINGS

FIG. 9 is a diagram schematically showing electric field distributions of different waveguide modes generated in the optical waveguide.

DESCRIPTION OF EMBODIMENTS

The present disclosure presents a novel optical coupling method in an optical integrated circuit (for example, polarization-multiplexing IQ modulator). The following description supposes that optical coupling between an optical fiber and an optical waveguide on an integrated chip is carried out through adjustment of positions of lenses. However, the optical coupling method according to the present disclosure is different from the Prior Art in a target of monitoring for guiding an optical focusing spot position of light toward the polarization-multiplexing IQ modulator to an optimal position on an end face of the optical waveguide. Therefore, the means for changing the optical focusing spot position for adjusting the optical coupling is not limited to adjustment of the lens positions. In addition, it should be noted that an algorithm for optimizing the optical coupling position is not limited, and the number and configuration of the lenses used are not limited either. First, a problem involved in the optical coupling method of the Prior Art in the polarization-multi-plexing IQ modulator, as an example of the optical integrated circuit, is described more in detail.

Figure 2:
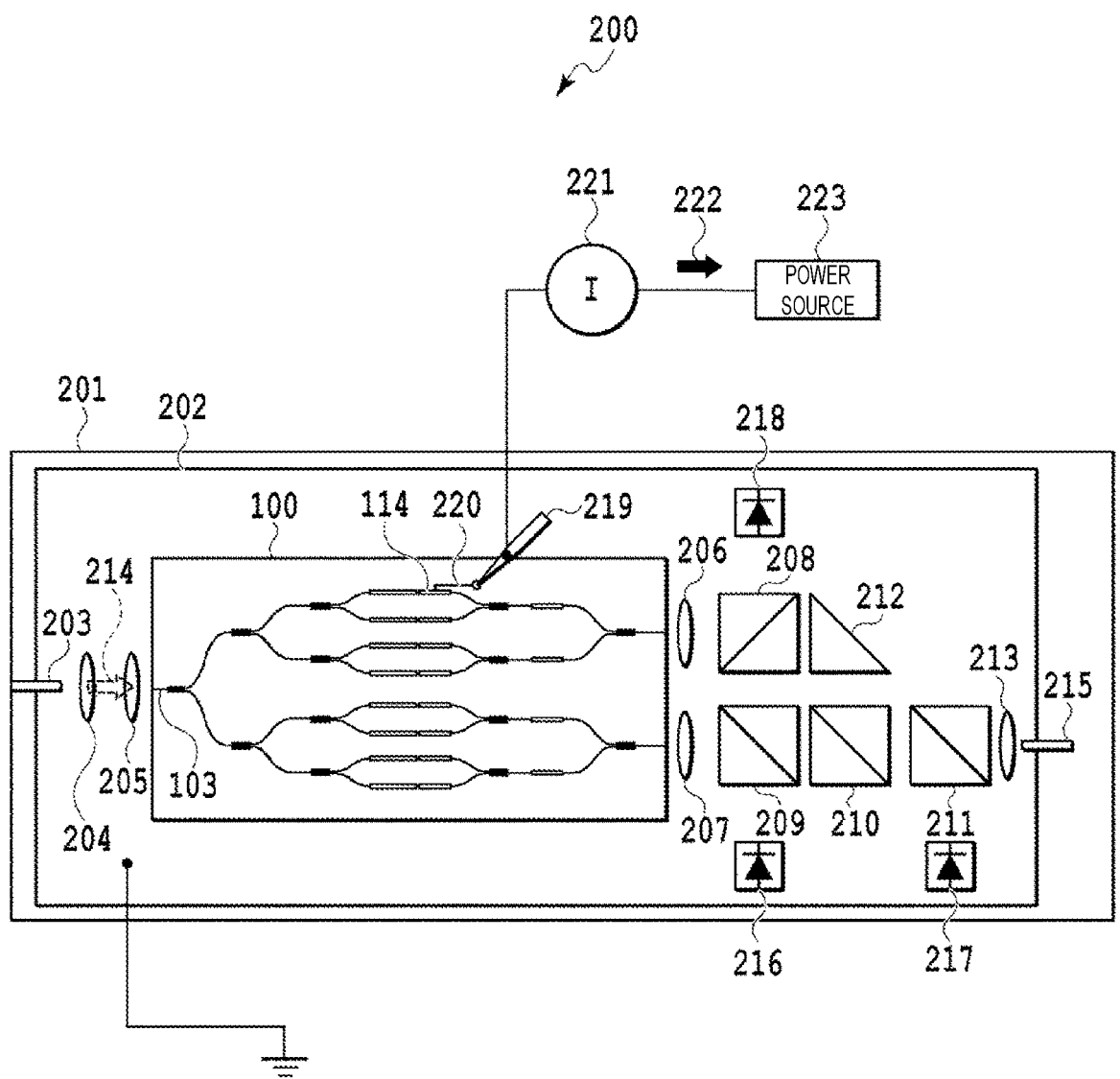
FIG. 2 is a diagram showing the polarization-multiplexing IQ modulator as a whole and an adjustment system of an optical coupling position thereof.

The method of adjusting the lens position on the basis of the photocurrent monitored by the one phase adjustment electrode 114 of the four child MZIs as shown in FIG. 2 has involved a problem of deterioration of optical characteristics of the polarization-multiplexing IQ modulator due to misalignment from the ideal optimal position. When the optical coupling is carried out in FIG. 2, the photocurrent obtained from certain one electrode among the eight phase adjustment electrodes has been monitored to adjust the input lens position such that the optical power (absolute value of photocurrent) is maximized. In this case, it is desirable that the optical focusing spot position of the light on an end face of the optical waveguide 103 of the integrated chip is adjusted, ideally, to be at the center of the core cross-section of the optical waveguide. However, in practice, the photocurrent reaches the maximum peak in a state in which the optical focusing spot position is misaligned from the center of the optical waveguide 103. The misalignment of the peak is caused in such a way that a higher order mode is generated on the input optical waveguide 103 in the state in which the optical focusing spot position is misaligned, and undergoes inter-mode recoupling with a base mode in the 1×2 MMI 104 of the input stage. As a result, monitoring the photocurrent from one electrode and adjusting the optical focusing spot position on the basis of the maximum value of the absolute value thereof lead to the state of being misaligned from the ideal optimal position.

FIG. 9 is a diagram schematically showing electric field distributions of different waveguide modes generated on the optical waveguide. When light from the input fiber 203 is incident on the center of the core cross-section of the optical waveguide 103, only a base mode 601, which has an electric field peak at the center position of the core, propagates on the optical waveguide 103. However, when light from the input fiber 203 is incident in a state in which the optical focusing spot position is misaligned from the center position of the core, a primary mode 602 is generated in the optical waveguide 103. The electric field distribution of the primary mode 602 has peaks of opposite polarity on both side of the center position of the core. When the base mode 601 and the primary mode 602 are input to the 1×2 MMI 104, the two modes are recoupled and interfere with each other, whereby branched light output from the 1×2 MMI 104 according to the interference state is maximized in a position misaligned from the center of the core. In other words, in the state in which the primary mode is generated, the photocurrent observed at the one phase adjustment electrode 114 on the integrated chip 100 is maximized when being misaligned from the core center position.

Figure 3:
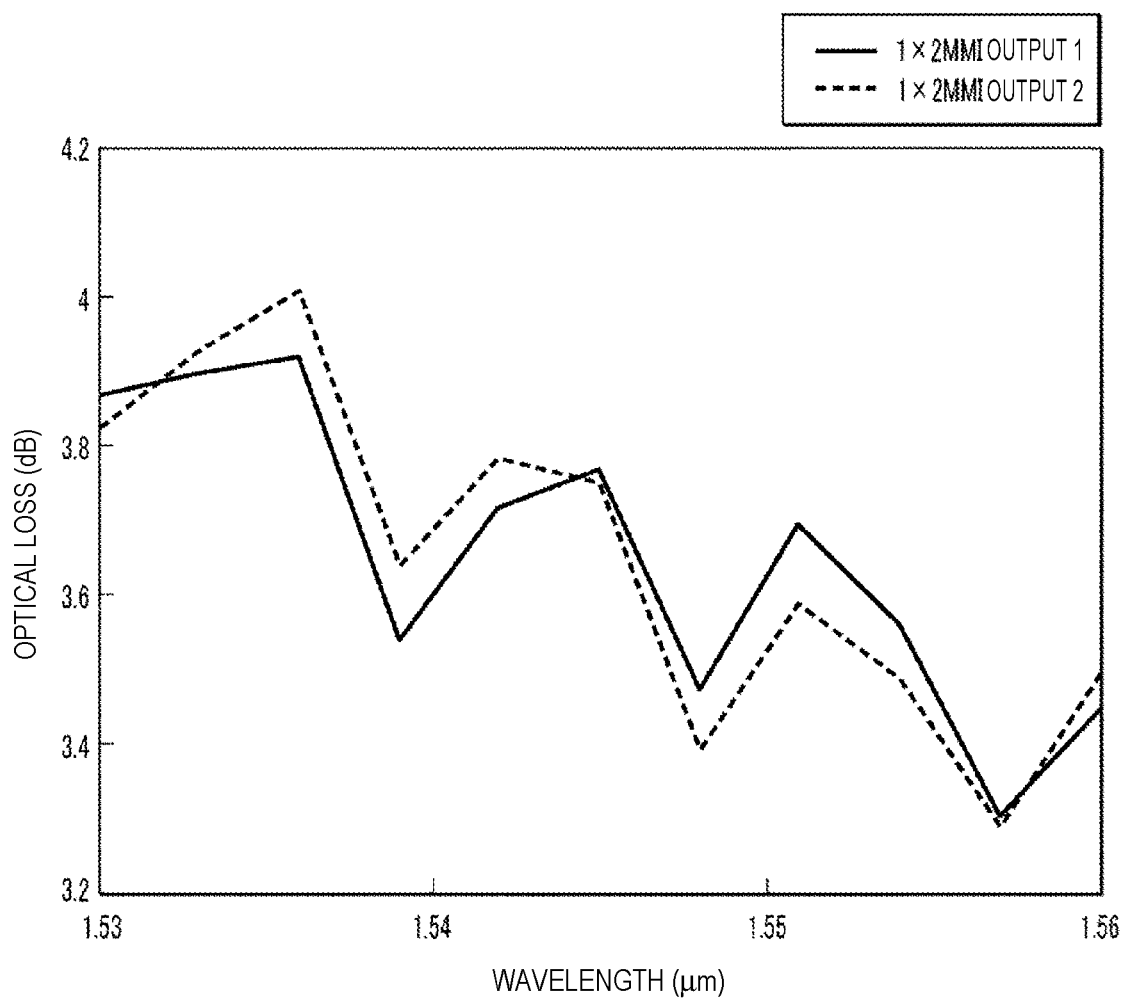
FIG. 3 is a diagram showing wavelength dependency of branched light from an MMI when an optical focusing position is misaligned.

FIG. 3 is a diagram showing wavelength dependency of 1×2 MMI branched light when an optical focusing spot position is misaligned from the center of the core. FIG. 3 shows calculated values of loss between the input waveguide 103 and each output port of the 1×2 MMI 104 in a case in which the optical focusing spot position is misaligned from the center of the core by +0.1 μm in a horizontal direction to the substrate. Supposing that the width of the input waveguide is 2 μm, a range from 1.53 to 1.56 μm is shown. It is observed that strong wavelength dependency is caused because the higher order mode and the base mode generated due to the misalignment of the optical focusing spot position are recoupled and interfere with each other at the 1×2 MMI 104. In addition, there is strong dependency in a difference in optical loss between two pieces of branched light branched at the 1×2 MMI 104. In the polarization-multiplexing IQ modulator 200 shown in FIG. 2, such wavelength dependency of the optical loss between the arm waveguides in the MZI leads to level variation of X-polarized wave output and Y-polarized wave output, and great loss of quality of an optical signal after multiplexing.

In the adjustment method of optical coupling for an optical integrated circuit according to the present disclosure, the optimal adjustment position of optical coupling is determined on the basis of, for example, a sum of a plurality of photocurrents at electrodes on arm waveguides respectively formed on the plurality of MZIs in the polarization-multiplexing IQ modulator. According to the maximum value of the sum of the plurality of photocurrents, the optical focusing spot position is adjusted to the center position of the end face core of the optical waveguide of the integrated chip. Typically, the optical focusing spot position is adjusted to the center position of the end face core by changing positions of the two input lenses. Hereinafter, a more specific embodiment of the optical coupling method for an optical integrated circuit according to the present disclosure is described.

Configuration for Adjustment of Optical Coupling for Optical Integrated Circuit

Figure 1:
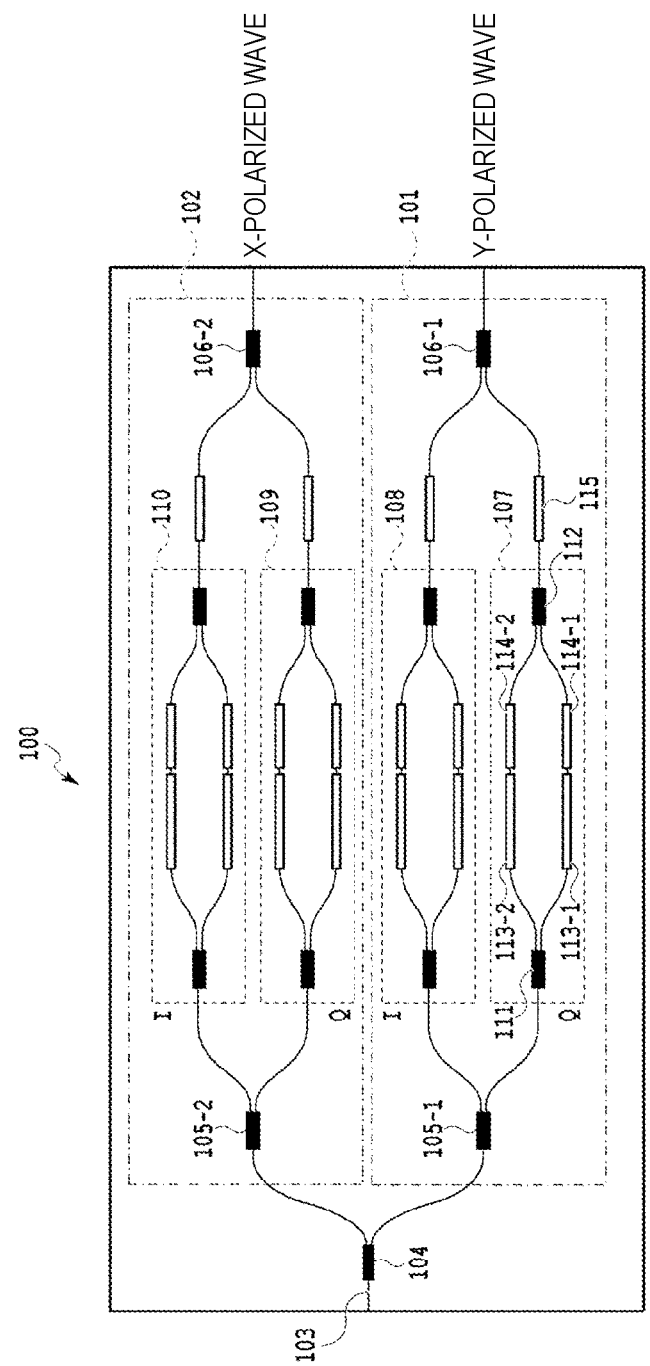
FIG. 1 is a diagram showing a portion integrated on a semiconductor substrate, of a polarization-multiplexing IQ modulator.
Figure 4:
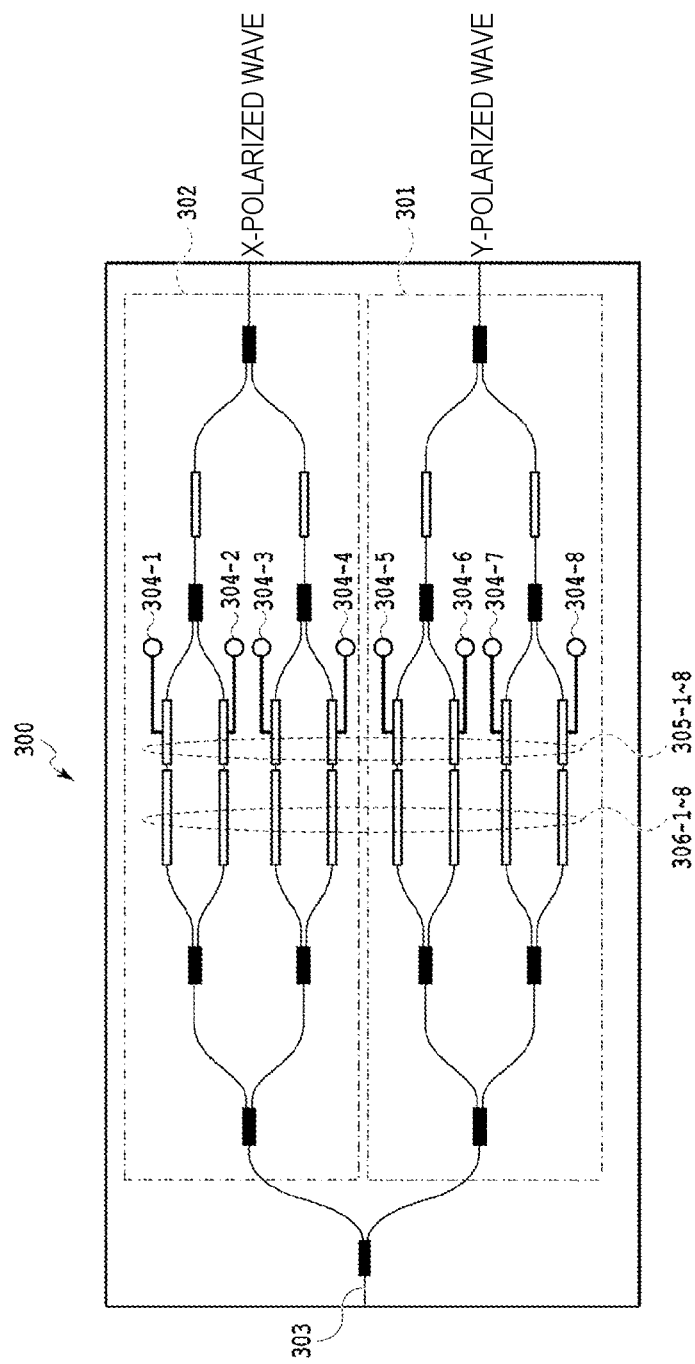
FIG. 4 is a diagram showing a configuration of the polarization-multiplexing IQ modulator in the optical coupling method according to the present disclosure.

FIG. 4 is a diagram showing a configuration of an optical circuit in which the polarization-multiplexing IQ modulator, which is optically coupled to optical fiber, is integrated, in the optical coupling method for an optical integrated circuit according to the present disclosure. In the integrated chip 300, similarly to the integrated chip 100 of the Prior Art shown in FIG. 1, light incident on the input waveguide 303 is branched by the 1×2 MMI and input to an IQ modulation circuit 302 for X-polarized wave and an IQ modulation circuit 301 for Y-polarized wave. Similarly to the configuration of the integrated chip 100 shown in FIG. 1, the MZIs are in a nested structure in each of the IQ modulation circuits. The integrated chip 300 is provided with modulation electrodes 306-1 to 306-8 and phase adjustment electrodes 305-1 to 305-8. In addition, a lead-out wiring and pads 304-1 to 304-8 used in the optical coupling method according to the present disclosure are formed. As described later, a predetermined voltage is applied from a power source to each of the pads 304-1 to 304-8 by means of contact pins, to monitor photocurrent flowing in each electrode.

Figure 5:
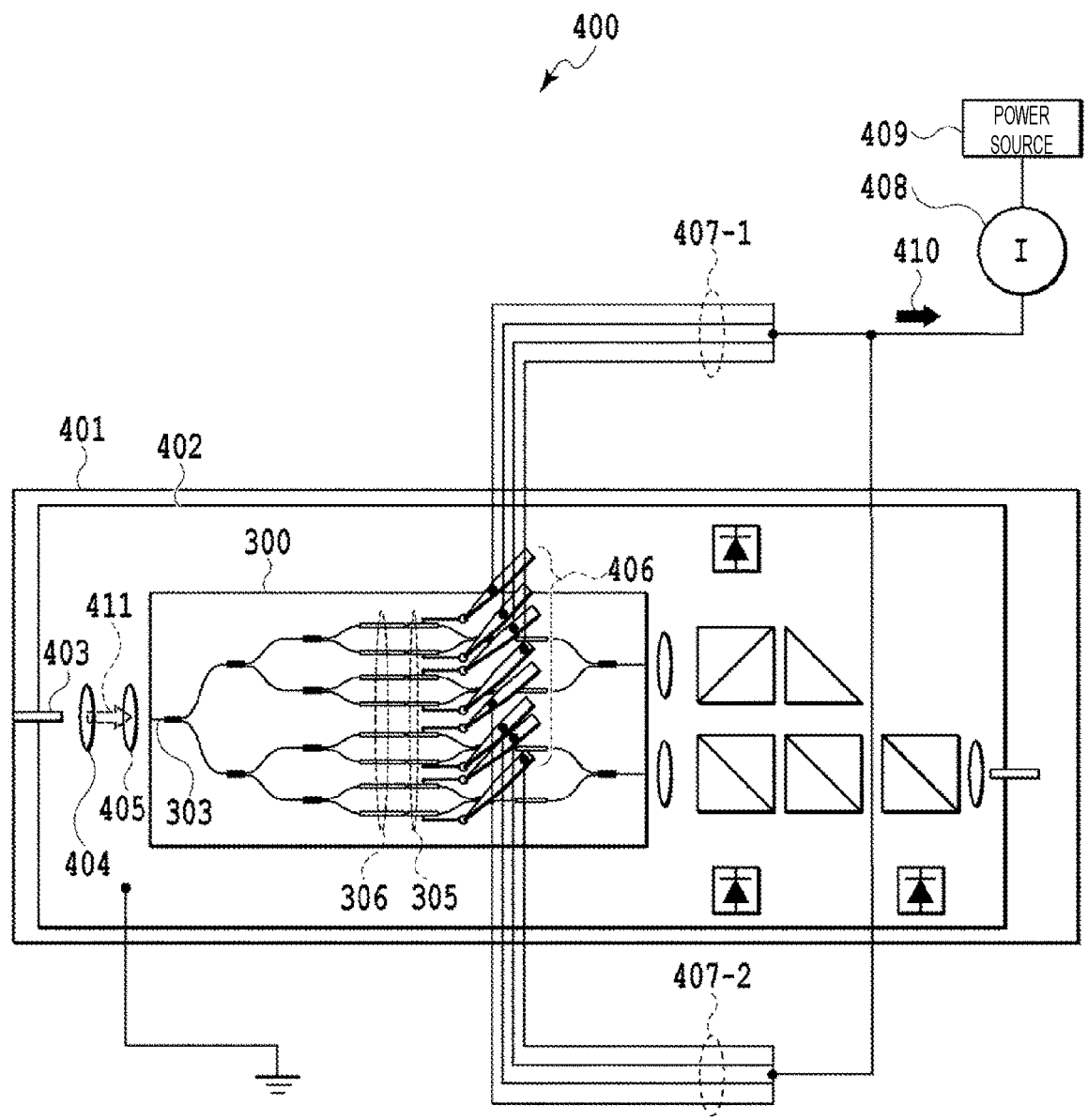
FIG. 5 is a diagram showing an adjustment system of an optical integrated circuit in the optical coupling method according to the present disclosure.

FIG. 5 is a diagram showing an overall configuration and an adjustment system of the polarization-multiplexing IQ modulator that is optically coupled in the optical coupling method according to the present disclosure. The configuration of the polarization-multiplexing IQ modulator 400 is similar to the configuration of the polarization-multiplexing IQ modulator 200 shown in FIG. 2 except for an electrode portion used for optical coupling, therefore detailed description thereof is omitted. In sum, in the polarization-multiplexing IQ modulator 400, an integrated chip 300 of an optical modulation circuit including two systems of IQ modulation circuits shown in FIG. 4 is mounted on a base 402 fixed inside a housing 401. Between the optical modulator 400 and the outside, local light is input from a light source to an input optical fiber 403, and modulated light is output from an output optical fiber.

The input fiber 403 and the lenses 404, 405 are used for inputting light to the polarization-multiplexing IQ modulator 400. During the adjustment of the positions in the optical coupling method according to the present disclosure, a sum of optical power (photocurrents) of the plurality of electrodes provided on eight arm waveguides of the MZI in the integrated chip 300 is monitored. Specifically, while the sum of the photocurrents in the eight arm waveguides is monitored, the two input lenses are fixed on the base 402 with lens positions where an absolute value of the sum of the photocurrent is maximized being optimal positions. The lens position adjustment steps are described later more in detail.

Waveguide Cross-Sectional Structure for Monitoring Photocurrent

Figure 6:
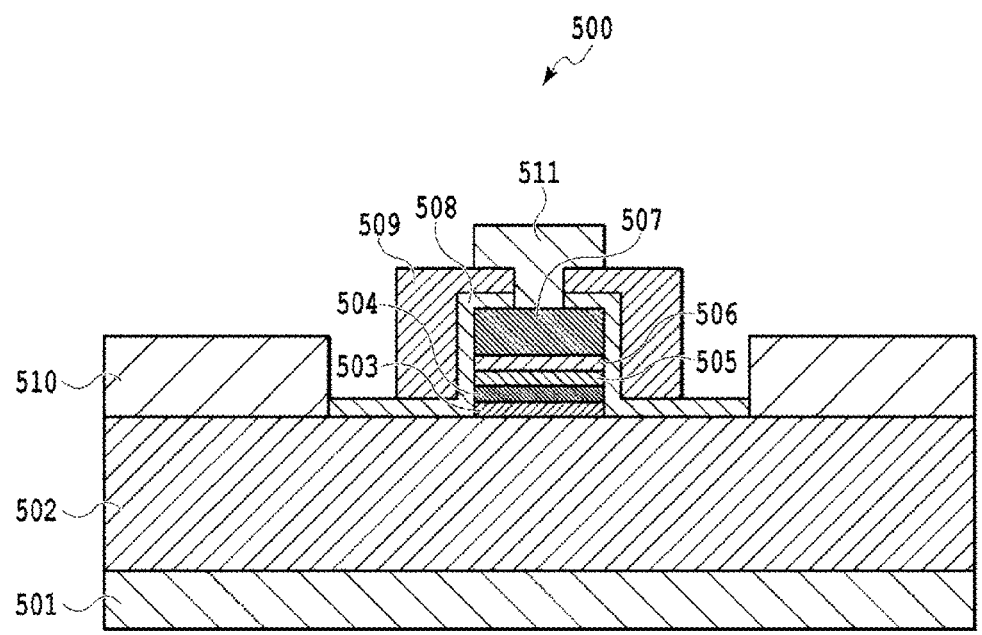
FIG. 6 is a diagram showing a cross-section of an optical waveguide of an electric field application region, where photocurrent is obtained, in the optical integrated circuit.

FIG. 6 is a diagram showing a cross-section of the optical waveguide of an electric field application region, where photocurrent is obtained in the optical coupling method for an optical integrated circuit according to the present disclosure. A cross-sectional configuration is shown of the arm waveguide of the MZI that monitors photocurrent in the integrated chip 300 of the polarization-multiplexing IQ modulator 400. The arm waveguide of the optical modulator is obtained by overlaying, on a Semi-insulating (SI)-InP substrate 501, an n-type InP lower cladding layer 502, a non-doped InP cladding layer 503, a multi-quantum well layer 504, a non-doped InP cladding layer 505, a p-type InAlAs layer 506, and an n-type InP cladding layer 507. The cross-sectional structure of the waveguide shown in FIG. 6 is a high-mesa structure obtained by etching to remove both lateral faces of the core. A $SiO_2$ film 508 as a protective film is deposited on the surface of the high-mesa structure. In addition, benzocyclobutene (BCB) 509 is formed to cover the entire waveguide covered by the protective film 508, to protect and flatten the surface of the high-mesa structure. In order to apply an electric field to an optical waveguide layer, a part of the $SiO_2$ film 508 and the BCB 509 on an upper side of the high-mesa is removed, and an electrode 511 is provided on an upper portion of the n-InP cladding layer 507.

By applying a negative voltage to the electrode 511, the phase of light propagating in the MQW core layer can be changed through the QCSE effect and the Pockels effect. In the optical coupling method according to the present disclosure shown in FIG. 5, a voltage is applied to each of the phase adjustment electrodes 305 to obtain photocurrents for respective electrodes, whereby a sum of these photocurrents can be monitored.

Optical Coupling Method

In the optical coupling method for an optical integrated circuit according to the present disclosure, the optical fiber 403 and the lenses 404, 405 are used for input and output of light to/from the polarization-multiplexing IQ modulator circuit 400. An adjustment method for coupling light from the input fiber 403 to the integrated chip 300 is as follows. As in the case of the Prior Art shown in FIG. 2, the input fiber 403, the input lens 404, the input lens 405, and the integrated chip 300 are fixed on the common base 402. The input fiber 403 is fixed with an adhesive, aiming at a mark formed on the base 402. The integrated chip 300 is also fixed on the base 402 in a similar manner, aiming at another mark. Next, the two input lenses 404, 405 are moved to the optimal positions while a plurality of photocurrents of the eight phase adjustment electrodes 305 are monitored, and fixed.

In the optical coupling method for an optical integrated circuit according to the present disclosure, the photocurrents obtained from the eight phase adjustment electrodes 305 formed respectively on the arm waveguides of the four child MZIs on the integrated chip 300 are collectively monitored. The eight phase adjustment electrodes 305 include independent pads as shown in FIG. 4, and are electrically connectable through making contact to respective pads by means of contact pins 406. The eight contact pins 406 are bundled into one through electric wirings 407-1, 407-2, and connected to a power source 409 via an ammeter 408. Collectively for the eight photocurrents, a sum of the eight photocurrents is considered as a photocurrent 410 to be monitored, and is used for adjustment of optical coupling. The positions of the two lenses 404, 405 were adjusted such that an absolute value of the photocurrent 410 being monitored by the ammeter 408 is maximized.

Therefore, the optical coupling method for an optical integrated circuit according to the present disclosure can be carried out as an optical coupling method for an optical integrated circuit including at least an input waveguide, a 1×2 branching circuit optically connected to the input waveguide, and two waveguides optically connected to the 1×2 branching circuit, including: measuring a sum of optical power of light propagating along each of the two waveguides; changing an optical focusing spot position to the input waveguide, such that the sum of the optical power is maximized; and determining a position of an optical component injecting light to the input waveguide with respect to the optical integrated circuit.

Here, the optical power of the light propagating along the waveguides is determined on the basis of photocurrents detected by electrodes respectively provided on the two waveguides, and the step of measuring may include measuring a sum of photocurrents of the two respective waveguides.

Since the optical focusing position to the optical waveguide on the end face of the integrated chip is dependent on the optical design of each lens, with regard to adjustment of the positions of the two input lenses, the lenses may be moved either separately or integrally. In a typical example of optical design, outgoing light from the optical fiber may be collimated by the first lens 404 and condensed by the second lens 405 on the end face. In addition, as long as the sum of the photocurrents of each of the phase adjustment electrodes is monitored, any control algorithm may be used for obtaining the maximum value of the absolute value of the sum of the photocurrent 410.

In the optical coupling method for an optical integrated circuit according to the present disclosure, photocurrents, which are on the plurality of arm waveguides of the MZIs arranged and configured in parallel, along which the branched light from the MMI to which the input waveguide is connected propagates, are used. The sum of the respective photocurrents of the plurality of arm waveguides, not a photocurrent on a single arm waveguide as in the Prior Art, is monitored to adjust the optical focusing spot position to a state in which the absolute value of the sum of the photocurrents is maximized. Therefore, the optical coupling method for an optical integrated circuit according to the present disclosure may be applied to any optical integrated circuit in which a plurality of MZIs are configured in parallel from an input stage via an MMI, and is not limited to adjustment of the polarization-multiplexing IQ modulator shown in FIG. 5. It is to be noted that the optical coupling method for an optical integrated circuit according to the present disclosure may be employed for optical coupling between an optical fiber and an input optical waveguide, for an optical integrated circuit in an optical circuit including a plurality of MZIs configured in parallel in vicinity of an input stage and at least a part of which has a balanced configuration.

In the example shown in FIG. 4 and FIG. 5, the optical focusing spot position is adjusted such that the absolute value of the sum of the photocurrents is maximized, on the basis of the sum of the photocurrents of all of the eight arm waveguides. However, even by using a sum of a partial plurality of photocurrents from the waveguides, among the eight arm waveguides, of different MZIs along which different pieces of branched light from the MMI on a first stage connected to the input waveguide 303 propagate, more accurate optical coupling is enabled than using the single photocurrent as in the Prior Art. For example, one photocurrent may be selected from each of the IQ modulation circuit 302 for X-polarized wave and the IQ modulation circuit 301 for Y-polarized wave, and a sum thereof may be obtained. Alternatively, in a tree-shaped configuration, a sum of four photocurrents in symmetrical positions, from the eight arm waveguides, may be used. In this case, regarding the waveguide to be monitored, photocurrents need to be monitored on the same number of waveguides from each of a first waveguide group along which one branched light from the MMI on the first stage propagates and a second waveguide group along which another branched light propagates. The first waveguide group includes waveguides corresponding to the pads 304-1 to 304-4 in FIG. 4. The second waveguide group includes waveguides corresponding to the pads 304-5 to 304-8 in FIG. 4.

Therefore, the optical coupling method for an optical integrated circuit according to the present disclosure can be carried out such that: at least one stage of a plurality of 1×2 branching circuits is further connected in series to the 1×2 branching circuit on a first stage; and corresponding waveguides respectively connected to output ports of the plurality of 1×2 branching circuits at a latter stage are provided; and the step of measuring the sum of the optical power of the light in the corresponding waveguides includes measuring a sum of photocurrents of an equal number of the corresponding waveguides selected respectively from a first waveguide group along which one branched light from the 1×2 branching circuit on a first stage propagates and a second waveguide group along which another branched light propagates, of the corresponding waveguides.

Referring to the configuration shown in FIG. 4 and FIG. 5, the method can be carried out such that: two more stages of 1×2 branching circuits are connected in series to the 1×2 branching circuit of a first stage in a tree shape, and corresponding four pairs of waveguides from respective four of the 1×2 branching circuits of a third stage are connected; and the step of measuring the sum of the optical power of the light in the corresponding waveguides includes measuring a sum of photocurrents of an equal number of the waveguides selected respectively from a first waveguide group along which one branched light from the 1×2 branching circuit on a first stage propagates and a second waveguide group along which another branched light propagates, of eight waveguides of the four pairs of waveguides.

In addition, although the phase adjustment electrodes 305-1 to 305-8 are used as electrodes where the photocurrents are measured in the foregoing description, the optical focusing spot position may also be adjusted on the basis of a sum of photocurrents flowing in the modulation electrodes 306-1 to 306-8 such that an absolute value of the sum of the photocurrents is maximized. Monitoring of the sum of the photocurrent of each of the modulation electrodes is similar to the case with the phase adjustment electrodes in FIG. 4 and FIG. 5.

Although the photocurrents on the waveguides on the output side of the 1×2 MMI on the third stage are used in the configuration shown in FIG. 4 and FIG. 5, for example the sum of photocurrents on the waveguides on the output side of the 1×2 MMI on the second stage may also be used. In the optical coupling method for an optical integrated circuit according to the present disclosure, it is only required that, in: the input waveguide; the 1×2 branching circuit optically connected to the input waveguide; and at least two waveguides optically connected to the 1×2 branching circuit, optical power from two waveguides along which different pieces of branched light from the 1×2 branching circuit on the input stage propagates, may be used.

As is already described, as an example, the similar effect can be produced through using the sum (absolute value of the sum of two photocurrents) of, among the eight waveguides on the output side of the 1×2 MMI on the third stage: the photocurrent from the pad 304-1 connected to the waveguide along which one branched light branched at the 1×2 MMI on the first stage propagates and the photocurrent from the pad 304-5 connected to the waveguide along which another branched light branched at the 1×2 MMI on the first stage propagates. Alternatively, as another example, a sum (absolute value of the sum of four photocurrents) of, among the eight waveguides on the output side of the 1×2 MMI on the third stage: the photocurrents respectively from the pads 304-3, 304-4 connected to the two waveguides along which one branched light branched at the 1×2 MMI on the first stage propagates, and the photocurrents respectively from the pads 304-7, 304-8 connected to the two waveguides along which another branched light branched at the 1×2 MMI on the first stage propagates, may also be used.

Although not shown in FIG. 4, it is also possible: to provide a pad for measuring a photocurrent on the output waveguide along which the branched light from the 1×2 MMI on the second stage propagates; and to use optical power from two waveguides, among the four waveguides on the output side of the 1×2 MMI on the second stage, along which different pieces of branched light from the 1×2 branching circuit on the first stage propagate. In other words, it is possible to select the same number of waveguides (N waveguides) from each of: the first waveguide group along which one branched light from the 1×2 MMI on the first stage propagates; and the second waveguide group along which another branched light propagates, and to measure a sum of 2N photocurrents of 2N waveguides thus selected. In this case, the first waveguide group and the second waveguide group are arranged in parallel on the same layer in the overall configuration of the optical integrated circuit. The overall configuration of the optical integrated circuit may be, as the eight arm waveguides shown in FIG. 4, a hierarchical structure in a tree shape with an MMI on the first stage being an apex.

It is confirmed as follows that more accurate optical coupling to the center position of the waveguide core is made possible on the basis of a sum of a plurality of photocurrents.

Effect of Using Plurality of Photocurrents

Figure 7:
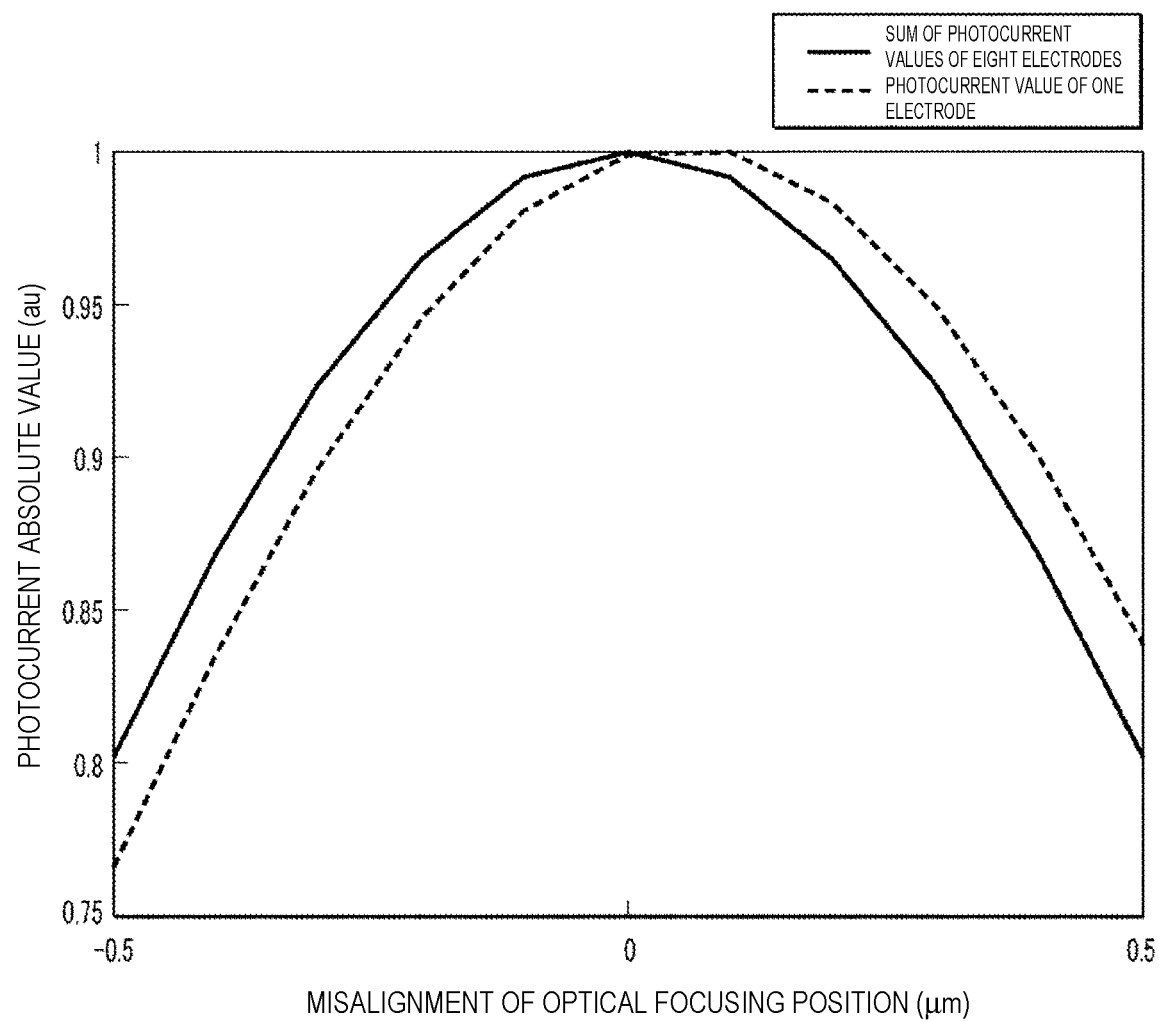
FIG. 7 is a diagram showing a relationship between a photocurrent and a misalignment amount of the optical focusing position, in comparison with the Prior Art.

FIG. 7 is a diagram showing a relationship between a photocurrent and a misalignment amount of the optical focusing position, in comparison with the Prior Art. The abscissa represents a misalignment amount of the optical focusing spot position from the core center in the width direction of the optical waveguide. Each one indicates a misalignment amount from the core center, in the case of arbitrarily misaligning the optical focusing spot position on the end face of the optical waveguide, by moving two lenses. The ordinate represents an amount obtained by normalizing an absolute value of a photocurrent by a peak value, in the optical coupling method for an optical integrated circuit of the Prior Art and that of the present disclosure.

It is observed that the peak position of the absolute value of a single photocurrent on one arm waveguide in the Prior Art, indicated by a dotted line, is misaligned from the core center position (0 μm) to one side by about 0.1 μm. On the other hand, a solid line indicates a photocurrent value in the case of monitoring the sum of the photocurrents obtained from respective phase adjustment electrodes of the eight arm waveguides as shown in FIG. 5. In the optical coupling method for an optical integrated circuit according to the present disclosure, the peak position of the absolute value of the sum of the photocurrents corresponds substantially to the center position of the core (0 μm), indicating that the peak value of the photocurrents corresponds to the center position of the core.

Figure 8:
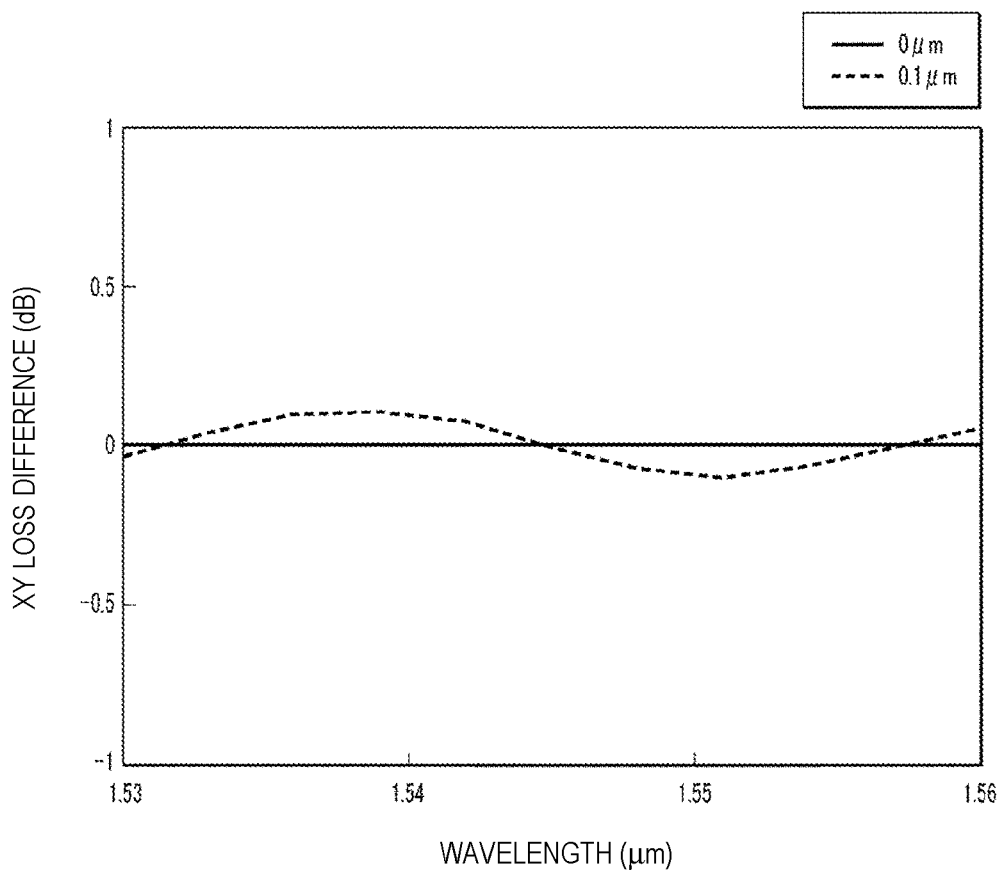
FIG. 8 is a diagram showing wavelength dependency of a XY loss difference of the polarization-multiplexing IQ modulator.

FIG. 8 is a diagram showing wavelength dependency of a XY loss difference of the polarization-multiplexing IQ modulator, in comparison with the Prior Art. The abscissa represents wavelength, and the ordinate represents in dB the XY loss difference represented by the following expression.

$$XY \text{ loss difference (dB)} = 10 \log(|I_{x1}|+|I_{x2}|+|I_{x3}|+|I_{x4}|+) - 10 \log(|I_{y1}|+|I_{y2}|+|I_{y3}|+|I_{y4}|+) \quad \text{Expression (1)}$$

In the expression, $I_{x1}$ to $I_{x4}$ represent respective photocurrents of the arm waveguides of the X-polarization side IQ modulator, and $I_{y1}$ to $I_{y4}$ represent respective photocurrents of the arm waveguides of the Y-polarization side IQ modulator. Photocurrents in the above expression (1) are currents respectively observed in the eight phase adjustment electrodes 305-1 to 305-8. The photocurrent (mA) and the optical power propagating along the optical waveguide under the electrode are in a proportional relationship.

Therefore, a difference between a decibel representation of the total value of the photocurrents on the X-polarization side and a decibel representation of the total value of the photocurrents on the Y-polarization side is defined as the XY loss difference (dB).

In the case of adjusting according to the optical coupling method of the Prior Art indicated by the dotted line, the optical focusing spot position thus adjusted is misaligned from the center of the core by 0.1 μm, resulting in a strong dependency of the XY loss difference. On the other hand, it is observed that the wavelength dependency of a XY loss difference is sufficiently small in the optical coupling method for an optical integrated circuit according to the present disclosure. The result shown in FIG. 8 indicates that the optical coupling method for an optical integrated circuit of the present disclosure is more advantageous from the viewpoint of wavelength dependency of the polarization-multiplexing IQ modulator.

In the case of the adjustment of the Prior Art with the optical focusing spot position being misaligned (x=+0.1 μm), a higher order mode is generated with a comparatively large proportion at the entrance of the input waveguide. At that time, the higher order mode and the base mode independently propagate along the input waveguide and then are recoupled to interfere with each other at the 1×2 MMI on the input stage. The interference condition upon recoupling is different depending on the wavelength, resulting in the comparatively strong wavelength dependency of the XY loss difference as indicated by the dotted line in FIG. 8. On the other hand, in the optical coupling method for an optical integrated circuit according to the present disclosure, it is considered that the wavelength dependency is reduced through suppression of an excitation amount of the higher order mode at the entrance of the input waveguide.

As described in detail in the foregoing, the optical coupling method for an optical integrated circuit according to the present disclosure enables more accurate adjustment of the optical focusing spot position to a core center position of the optical waveguide. Loss of optical signal quality such as an increase in optical loss and wavelength dependency of characteristic value due to generation of the higher order mode may be suppressed in the optical integrated circuit. The sum of the photocurrents of respective waveguides may be obtained in any optical integrated circuit in which an optical branching/synthesis means such as an MMI is provided on the input stage, and, on the back thereof, an interference circuit including an arm waveguide such as an MZI is configured in parallel. The aforementioned loss of optical signal quality can be suppressed by adjusting the optical focusing spot position on the basis of the sum of photocurrents of a plurality of optical waveguides configured in parallel.

INDUSTRIAL APPLICABILITY

The present invention can be applied to an optical signal processing device for optical communication.

The invention claimed is:

1. An optical coupling method for an optical integrated circuit comprising at least an input waveguide, a 1×2 branching circuit optically connected to the input waveguide, and two waveguides optically connected to the 1×2 branching circuit, comprising:
   measuring a sum of optical power of light propagating along each of the two waveguides;
   changing an optical focusing spot position to the input waveguide, such that the sum of the optical power is maximized; and
   determining a position of an optical component injecting light to the input waveguide with respect to the optical integrated circuit.

2. The method according to claim 1, wherein
   the optical power of the light propagating along the waveguides is determined on the basis of photocurrent detected by electrodes respectively provided on the two waveguides; and
   the measuring comprises measuring a sum of photocurrents of the two respective waveguides.

3. The method according to claim 2, wherein
   the optical integrated circuit further comprising:
   at least one stage of a plurality of 1×2 branching circuits being connected in series to the 1×2 branching circuit; and
   corresponding waveguides respectively connected to output ports of the plurality of 1×2 branching circuits at a latter stage; and
   the measuring comprises measuring a sum of photocurrents of an equal number of the corresponding waveguides selected respectively from a first waveguide group and a second waveguide group, one branched light from the 1×2 branching circuit on a first stage propagating along the corresponding waveguides of the first waveguide group, another branched light from the 1×2 branching circuit on the first stage propagating along the corresponding waveguides of the second waveguide group.

4. The method according to claim 2, wherein the optical integrated circuit further comprising:
   two more stages of 1×2 branching circuits being connected in series to the 1×2 branching circuit of a first stage in a tree shape; and
   corresponding four pairs of waveguides from respective four of the 1×2 branching circuits of a third stage; and
   the measuring comprises measuring a sum of photocurrents of an equal number of the waveguides selected respectively from a first waveguide group and a second waveguide group, the four pairs of waveguides having eight waveguides, one branched light from the 1×2 branching circuit on a first stage propagating along the waveguides of the first waveguide group, another branched light from the 1×2 branching circuit on the first stage propagating along the waveguides of the second waveguide group.

5. The method according to claim 4, wherein a sum of photocurrents of all of the eight waveguides is measured.

6. The method according to claim 1, wherein the optical focusing spot position is changed by moving at least one lens between the input waveguide and an input fiber.

7. Optical coupling method for an optical integrated circuit comprising at least an input waveguide, and a plurality of branching circuits including at least two stages being connected in series in a tree shape and optically connected to the input waveguide, wherein at least a part of the plurality of branching circuits on a last stage comprises at least two arm waveguides and configures a Mach-Zehnder interferometer (MZI) arranged in parallel,
   the method comprising:
   measuring a sum of optical power of light propagating along an equal number of the arm waveguides selected respectively from a first waveguide group and a second waveguide group, one branched light from the branching circuit on a first stage propagating along the arm waveguides of the at least two arm waveguides of the first group, another branched light from the branching circuit on the first stage propagating along the arm waveguides of the at least two arm waveguides of the second group;
   changing an optical focusing spot position to the input waveguide, such that the sum of the optical power is maximized; and
   determining a position of an optical component injecting light to the input waveguide with respect to the optical integrated circuit.

8. The method according to claim 7, wherein
   the optical power of the light propagating along the at least two arm waveguides is determined on the basis of photocurrents detected by electrodes respectively provided on the arm waveguides; and
   the measuring comprises measuring a sum of a plurality of photocurrents of the arm waveguides.

* * * * *